United States Patent [19]
Inoue et al.

[11] Patent Number: 6,093,897
[45] Date of Patent: Jul. 25, 2000

[54] COLLISION DETECTION DEVICE HAVING ECCENTRIC MASS AND INERTIAL MASS

[75] Inventors: Takashi Inoue, Kariya; Sadayuki Kuwahara, Bisai; Seiichi Narita, Kariya, all of Japan

[73] Assignee: Denso Corporation, Kariya, Japan

[21] Appl. No.: 08/901,954

[22] Filed: Jul. 29, 1997

[30] Foreign Application Priority Data

| Jul. 30, 1996 | [JP] | Japan | 8-217917 |
| Jul. 31, 1996 | [JP] | Japan | 8-219353 |
| Apr. 11, 1997 | [JP] | Japan | 9-110357 |
| Jun. 13, 1997 | [JP] | Japan | 9-173032 |

[51] Int. Cl.$^7$ .................................................. H01H 35/06
[52] U.S. Cl. .............................. 200/61.45 R; 200/61.48
[58] Field of Search ................ 200/61.45 R, 61.44, 200/61.45 M, 61.46, 61.48, 61.49, 61.51, 61.52, 52 A

[56] References Cited

U.S. PATENT DOCUMENTS

| 3,674,950 | 7/1972 | Scoville | 200/61.48 |
| 4,022,997 | 5/1977 | Inagaki et al. | 200/61.45 R |
| 4,104,493 | 8/1978 | Hibino et al. | 200/61.45 R |
| 4,188,517 | 2/1980 | Narita et al. | 200/61.45 R |
| 4,362,913 | 12/1982 | Kumita et al. | 200/61.45 R |
| 5,477,428 | 12/1995 | Brown et al. | 200/61.48 |
| 5,914,470 | 6/1999 | Suzuki et al. | 200/61.45 R |
| 5,920,045 | 7/1999 | Suzuki et al. | 200/61.45 R |

FOREIGN PATENT DOCUMENTS 57-147838  9/1982  Japan .

*Primary Examiner*—Renee Luebke
*Attorney, Agent, or Firm*—Pillsbury Madison & Sutro, LLP

[57] ABSTRACT

A collision detection device has a weight, which includes an eccentric mass and a metallic plate. The weight is pivoted by a shaft at a position eccentric from the mass barycenter to have a predetermined swing velocity and frequency response. A rotor is fixed to the weight, and contact springs having contacts are provided to exert a resilient force to the weight. When the acceleration caused by the impact of collision acts on the weight, it swings against the spring force, and bounces on a stopper to swing back. The rotor which swings together with the weight causes the contacts on the springs to close at a certain swing angle, producing a collision detection signal. The eccentric mass and the metallic plate may be provided to swing separately from each other depending on the magnitude of acceleration.

23 Claims, 11 Drawing Sheets

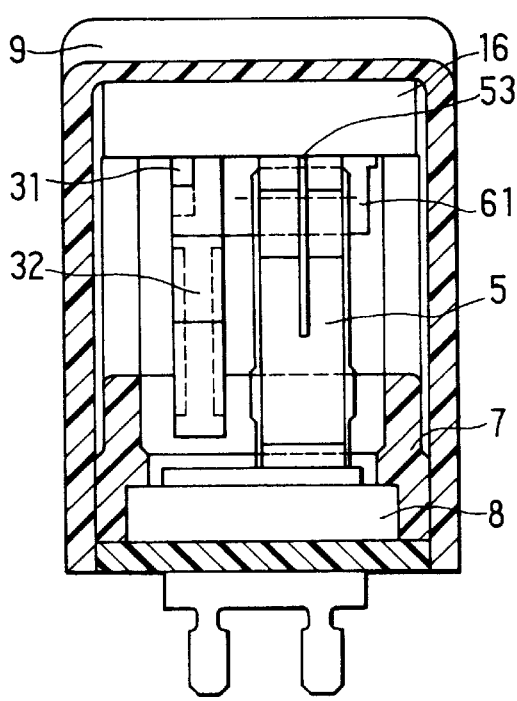
FIG. 1(a)
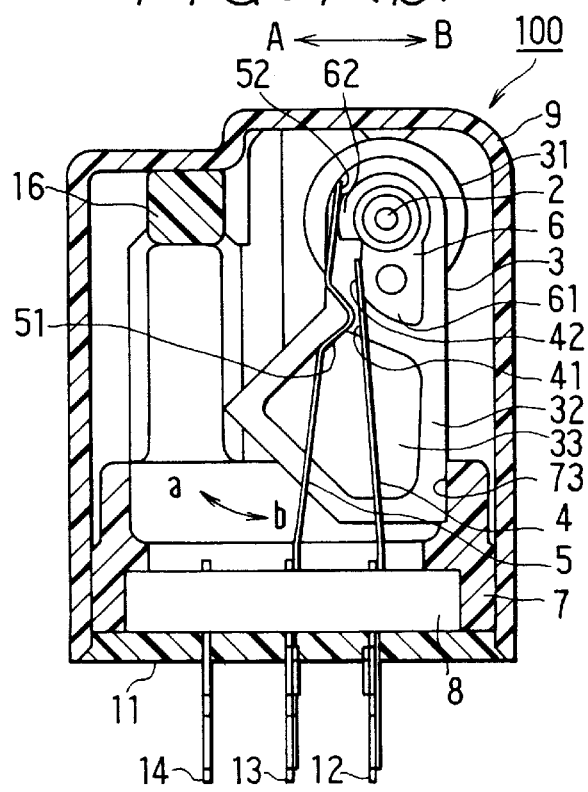
FIG. 1(b)
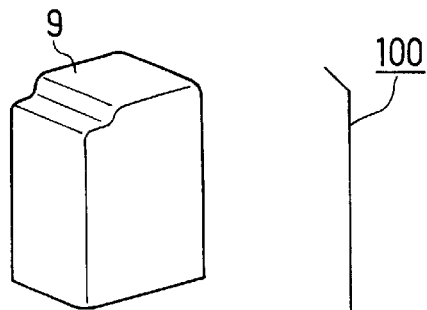
FIG. 2
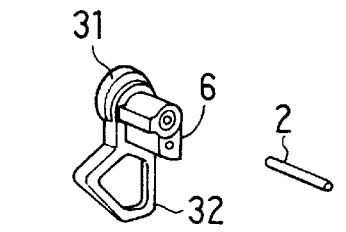
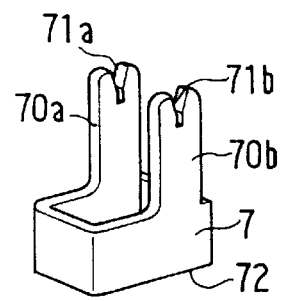
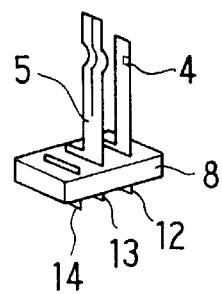

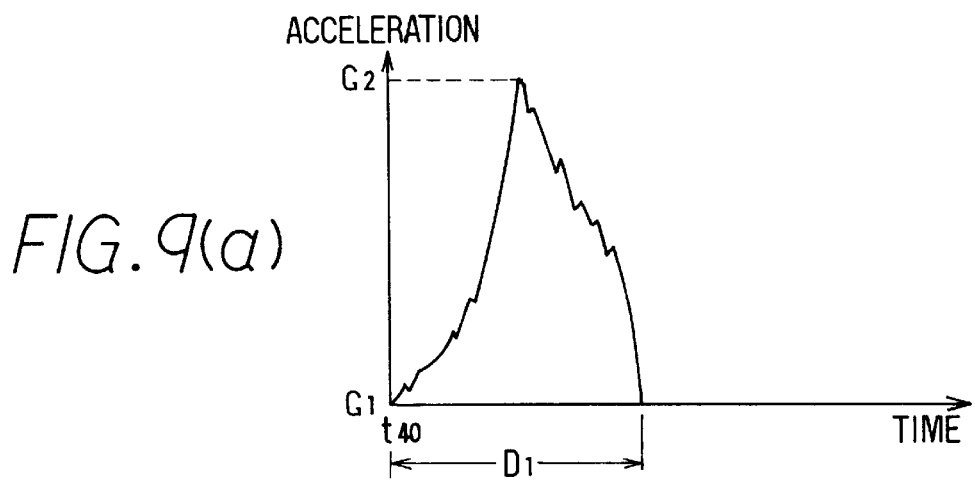
FIG.9(a)
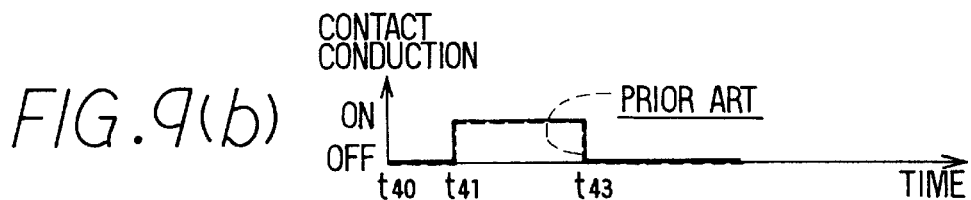
FIG.9(b)
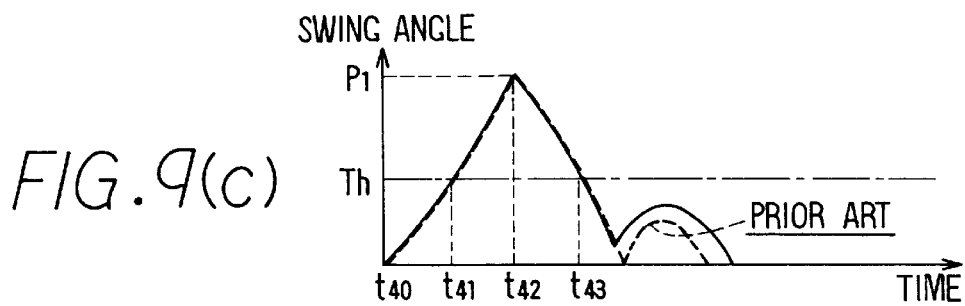
FIG.9(c)
FIG.9(d) FIG.9(e) FIG.9(f) FIG.9(g)
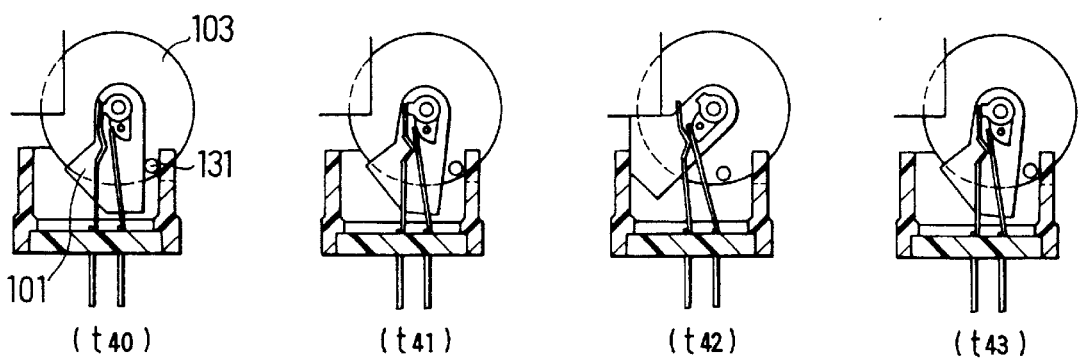

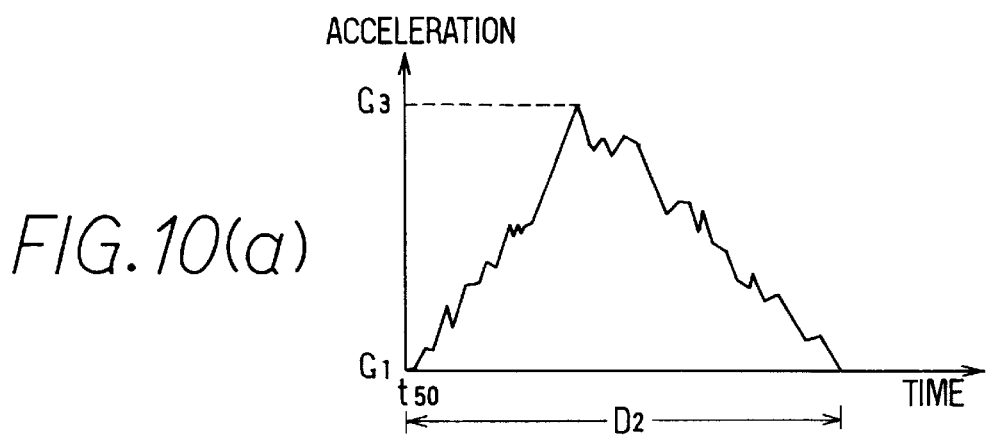
FIG.10(a)
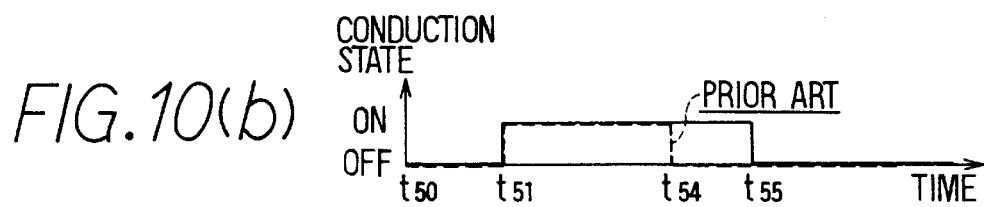
FIG.10(b)
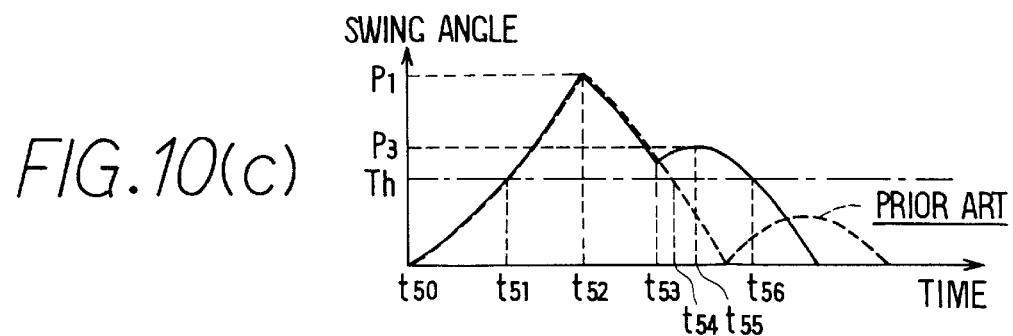
FIG.10(c)
FIG.10(d)  FIG.10(e)  FIG.10(f)  FIG.10(g)
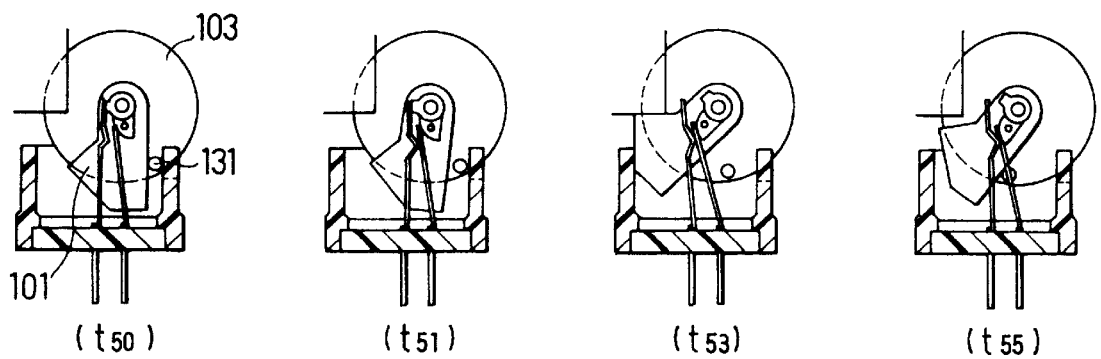

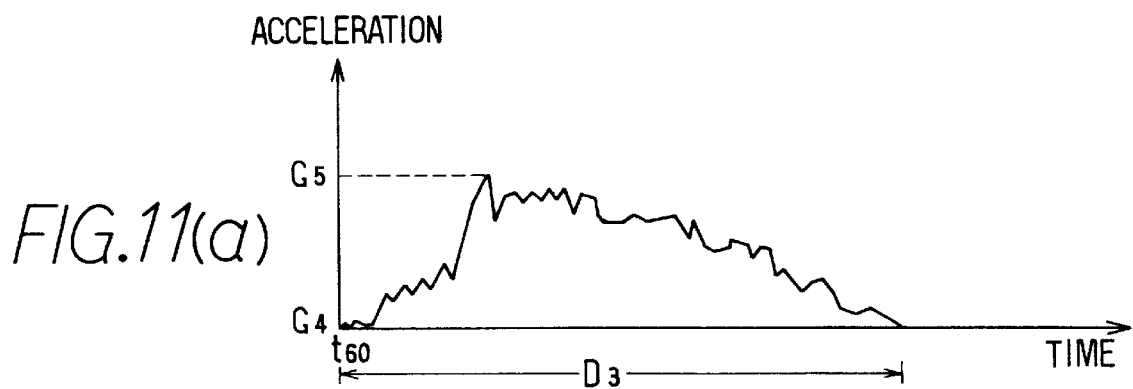
FIG.11(a)
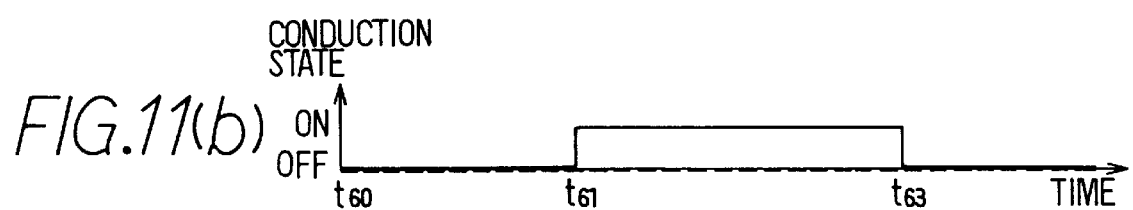
FIG.11(b)
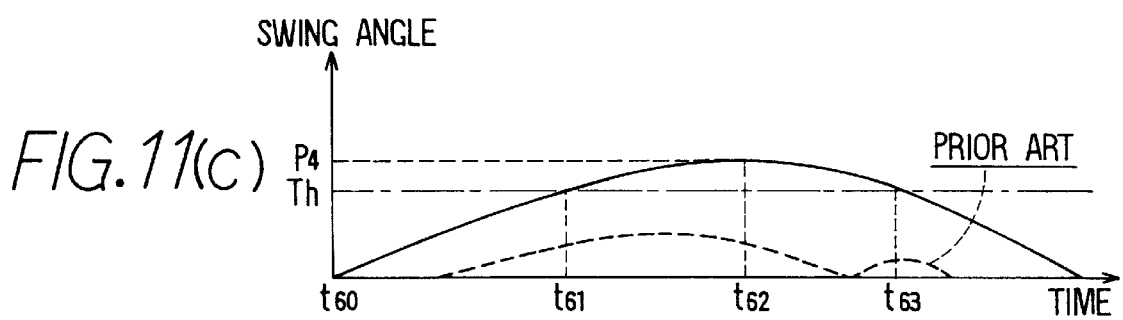
FIG.11(c)
FIG.11(d)  FIG.11(e)  FIG.11(f)
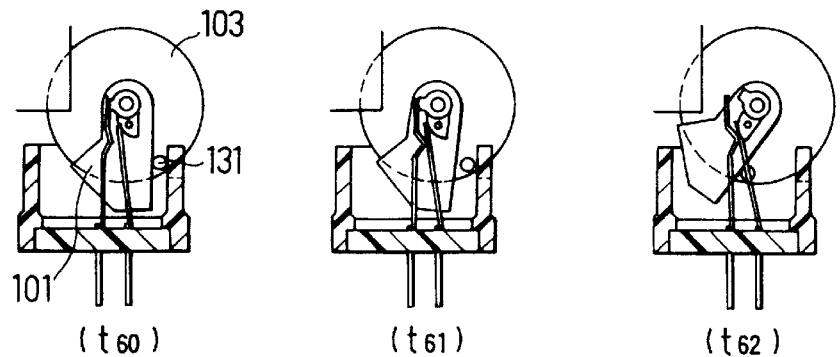

COLLISION DETECTION DEVICE HAVING ECCENTRIC MASS AND INERTIAL MASS

CROSS REFERENCE TO RELATED APPLICATION

This application is related to Japanese Patent Applications No. 8-217917 filed on Jul. 30, 1996, No. 8-219353 filed on Jul. 31, 1996, No. 9-110357 filed on Apr. 11, 1997 and No. 9-(not known) filed on Jun. 13, 1997, the contents of which are incorporated herein by reference.

BACKGROUND OF THE INVENTION

1. Field of the Invention

The present invention relates to a collision detection device which is designed to detect collision of a moving body based on the detection of acceleration above a certain level acting on the device. This collision detection device is used, for example, to trigger the activation timing device of the air bag system or seat belt tensioner which protects passengers in the vehicle in the event of collision.

2. Related Art

Among conventional mechanical-type collision detection devices used for activating air bags, Japanese patent publication JP-A 8-264088 discloses a device, which includes a pendulum (termed as "weight" hereinafter) pivoted at a position eccentric from its barycenter so that it swings in response to an acceleration above a certain level acting on it in a certain direction. A cam rotor turns together with the weight and operates to close associated electrical contacts, thereby producing a collision detection signal.

This collision detection device include a contact spring which exerts a force on the weight against the swing motion caused by the impact of collision thereby defining a threshold of detection and restricting the weight from swinging when the vehicle does not actually collide, thereby preventing the erroneous detection. A stopper is provided on the path of swing motion of the weight so that the swing motion at the impact of collision is limited thereby.

The above-mentioned mechanical-type collision detection device is mainly used as a redundant safety sensor to back up an active electronic acceleration sensor, and in this case it is designed to have a weight of a large eccentric mass moment and a moment of inertia that is small enough to swing at the incident of collision.

However, the conventional collision detection device of the above-mentioned structure may not meet the demand satisfactorily in some cases. For example, if the collision detection device is installed in the vehicle crash zone or is used to detect the incident of side collision, the weight, with its large eccentric mass moment and small moment of inertia, will have a large swing velocity and thus will have a large bouncing force by when it impacts the stopper with short duration, large-amplitude acceleration. The resulting reciprocating motion of the weight induces the chattering of electric contacts and produces an unstable pulsative collision detection signal.

Particularly, in an air bag system where a collision detection signal is subjected to logical-product gating with other sensor signals in triggering an inflator, the unstable collision detection signal can possibly fail to inflate the air bag.

In order to restrict the reciprocating motion of the weight when it undergoes the impact of short duration, large-amplitude acceleration, it must be designed to have a large moment of inertia which depends on its shape. The amplitude and duration of acceleration caused by the impact of collision varies depending on the type of vehicle, device installation location, and direction of collision. Therefore, in order to provide a proper moment of inertia for the weight to meet individual functional conditions, it needs to be designed on a trial-and-error basis, resulting in a high manufacturing cost.

SUMMARY OF THE INVENTION

Accordingly, an object of the present invention is to provide a collision detection device which enables easy setting of the moment of inertia of a weight without varying an eccentric mass moment so that a stable collision detection signal is produced under various operational conditions including variations in vehicle types, device installation locations, and collision sensing directions, the optimal design of the weight is made easy, and the manufacturing cost is reduced.

Another object of the present invention is to provide a collision detection device capable of responding to acceleration of collision of different durations at the proper timing.

Still another object of the present invention is to produce a stable collision detection signal by providing a collision detection device capable of restricting the weight, which undergoes the acceleration caused by the collision, from having a reciprocating motion when it hits a stopper and bounces, thus suppressing the chattering of contacts at the impact of collision by restricting the swing angle of the weight within a certain range.

Still another object of the present invention is to provide a collision detection device which keeps a closed state of contacts for a sufficient period of time.

A collision detection device according to the present invention includes a weight which is pivoted at a position eccentric from its barycenter so that it swings in response to an acceleration above a certain level acting on it, with the conduction state of contacts being varied by the swing motion, thereby producing a collision detection signal. The collision detection device is based on the scheme of providing an intended moment of inertia for the weight without varying the eccentric mass moment, thereby determining the swing velocity and frequency response of the weight arbitrarily while retaining the threshold of detection.

In order to achieve the above objective, a collision detection device according to one aspect of the present invention includes a weight which consists of an eccentric section and an inertial section, with the eccentric section having a swing axis eccentric from its barycenter and defining the eccentric mass moment of the weight. The inertial section which swings together with the eccentric section is substantially symmetrical with respect to its barycenter and defines the moment of inertia about the swing shaft of the weight without varying the eccentric mass moment of the weight. Accordingly, it is possible to provide an intended moment of inertia of the weight without varying the eccentric mass moment and thus determine the swing characteristics of the weight arbitrarily while retaining the threshold of detection. By providing a large moment of inertia for the weight so as to be suited for a crash sensor and for the detection of side collision, for example, in which cases the impact of short duration, large-amplitude acceleration acts on the device, the swing velocity of the weight can be made smaller, the bouncing force of the weight produced when it hits the swing limiting member can be made smaller, and the reciprocating motion of the weight between the swing limiting members can be suppressed. Thus, the chattering of contacts can be prevented, and a stable collision detection signal can be produced. Based on the alteration of only the moment of inertia of the inertial section, the weight has its moment of inertia adjusted easily at the time of prototype manufacturing to meet various operational conditions, including: use as an active crash sensor or backup safety sensor, type of vehicle, device installation location, and collision sensitive directions instead of having to alter the weight design to meet individual conditions. Thus, the manufacturing cost of the collision detection device can be reduced.

Preferably, the inertial section of the weight has a larger specific gravity than the eccentric section, thereby being capable of readily performing as an active crash sensor. The weight can have a smaller inertial section, and a compact collision detection device can be accomplished. More preferably, the eccentric section is made of resin and the inertial section is made of metal.

Preferably, the moment of inertia of the inertial section determines the moment of inertia of the weight, thereby allowing the arbitrary setting of the frequency response to the acceleration of the weight adapted to each operational condition. More preferably, the moment of inertia of the weight determines the lower limit of the period of acceleration at which the conduction state of the contacts is varied, thereby restricting the weight from swinging due to an acceleration below a certain period.

Preferably, the inertial section is made or shaped to determine the moment of inertia thereof about the swing shaft, thereby allowing the arbitrary setting of the moment of inertia of the whole weight. More preferably, the inertial section has a shape of plate, the span, thickness or specific gravity of which can be tailored to allow the easy and arbitrary setting of the moment of inertia of the weight. More preferably, the inertial section has a shape of disc so as to achieve the largest moment of inertia at smallest dimensions, thereby contributing to the compact design of the collision detection device.

Preferably, the inertial section is insert-molded with the eccentric section made of resin, thereby accomplishing a steady mechanical connection of the eccentric and inertial sections to complete the weight.

Preferably, the inertial section and the eccentric section are separate parts, and the inertial section is fixed to a swing shaft which swings together with the eccentric section so that the inertial section swings together with the eccentric section.

According to another aspect of this invention, a first weight which is pivoted as an eccentric mass section at a position eccentric from a barycenter is subject to the exertion of a swing-inhibiting bias force, and the conduction state of contacts are varied by the swing motion of the weight. The first weight has a swing velocity proportional to the strength of acceleration acting on it. A second weight which is provided as an inertial section mass section swings slower than the first weight in response to the acceleration. The first weight is coupled to the second weight when the second weight swings. In case the impact of collision is directly on the collision detection device, in which case the acting acceleration has a large amplitude and short or medium duration (i.e., acceleration frequency exceeding a predetermined frequency), the first and second weights have a significant difference of swing velocity and the first weight alone can vary the contact conduction state by swinging in a first direction against the bias force. The greater the acceleration, the quicker is the timing of response required. The quick response timing is attained by the swing of only the first weight. In case the impact of collision is far from the collision detection device, in which are the acting acceleration has a small amplitude and long duration, the first weight is inert and the second weight responds. In this case, the first weight is coupled to the second weight, and both weights swing together to vary the conduction state of contacts. The timing of response is not required to be so quick as the case of the short duration, large-amplitude acceleration.

BRIEF DESCRIPTION OF THE DRAWINGS

Other objects, features and advantages of the present invention will be made more apparent by the following detailed description with reference to the accompanying drawings, in which:

FIGS. 1(a) and 1(b) are cross-sectional views showing internal structures of a collision detection device according to a first embodiment of this invention;

FIG. 2 is an exploded view showing an assembly of component parts of the collision detection device of the first embodiment;

FIGS. 9(a) through 9(g) are charts and schematic views showing the operation of the collision detection device of the second embodiment in case the impact of collision is on the device;

FIGS. 10(a) through 10(g) are charts and schematic views showing the operation of the collision detection device of the second embodiment in case the impact of collision is near the device;

FIGS. 11(a) through 11(f) are charts and schematic views showing the operation of the collision detection device of the second embodiment in case the impact of collision is far from the device;

DETAILED DESCRIPTION OF THE PREFERRED EMBODIMENT

Figure 3A:
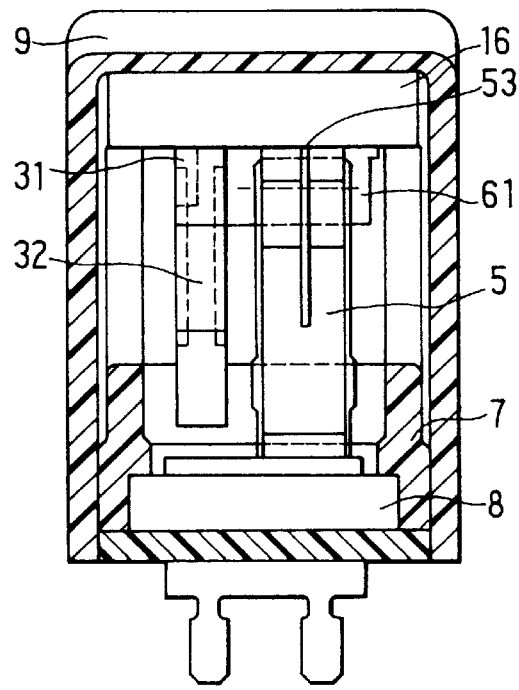
FIGS. 3(a) and 3(b) are cross-sectional views of the collision detection device according to the embodiment, showing its actuated state.

Various embodiments of this invention will be explained with reference to the drawings.

(First Embodiment)

FIGS. 1(a) and 1(b) are front and side cross-sectional views of a collision detection device 100 based on this invention, with its contacts 41 and 51 being open in the absence of acceleration above a certain level. The collision detection device 100 has a collision sensitive direction indicated by the arrow A, and has its weight 3 swingable about a swing axis (swing shaft) 2 in the direction indicated by the arrow a in response to the impact of collision. FIG. 2 shows the assembly of the component parts of the collision detection device 100.

The collision detection device 100 has a cover 9 made of resin, a flat base 8, and a housing 7. The base 8 is press-fitted to the housing 7, and the housing 7 is press-fitted to the cover 9. Adhesive 11 is applied to the bottom of the base 8 in order to keep the hermetic sealing of the collision detection device 100.

The housing 7 has a base section 72 and a pair of confronting stem sections 70a and 70b, which have the formation of cuts 71a and 71b at the top. The shaft 2 is fixed at its both ends to the cuts 71a and 71b of the stems 70a and 70b and adapted to support the weight 3 swingably about its swing axis which is eccentric from the barycenter.

The weight 3 comprises a disk-shaped metallic plate (inertial mass section) 31 which is made of Al, Cu, W or the like and machined to have a disc shape and centered by the barycenter, and an eccentric mass (eccentric mass section) 32 which is made of resin. These sections are joined mechanically based on resin insert molding. The eccentric mass 32 has on both sides thereof the formation of recesses 33, by which a predetermined value of eccentric mass moment is provided for the weight 3.

The weight 3 has its eccentric mass moment M$R_T$ and moment of inertia I$_T$ expressed by the following formulas (1) and (2) in terms of the eccentric mass moment mr and moment of inertia i of the eccentric mass 32 and the moment of inertia I of the metallic plate 31. The metallic plate 31 has no eccentric mass moment since its swing axis is not eccentric from the barycenter.

$$MR_T = mr \quad (1)$$

$$I_T = i + I \quad (2)$$

As explained by the formulae (1) and (2), it is possible for the weight 3 with the metallic plate 31 to have its moment of inertia I$_T$ increased by the amount of the moment of inertia I of the metallic plate 31 without varying the eccentric mass moment MR$_T$.

Formed on the weight 3 is a rotor 6 of resin mold, which has a first cam 61 and second cam 62 and shares the shaft 2 with the weight 3. Accordingly, the rotor 6 swings together with the weight 3 about the shaft 2. The first and second cams 61 and 62 have their profiles shaped such that the distance of contacts 41 and 51 formed on flat contact springs 4 and 5 (explained below) decreases as the weight 3 swings.

The contact springs 4 and 5 having the respective contacts 41 and 51 are fixed to stand on the base 8. The contact 41 is formed at a flat section of the spring 4, while the contact 51 is formed at a section of the spring 5 which is bent to protrude toward the contact 41. The contact springs 4 and 5 exert a resilient force to the rotor 6 in the direction opposite to the action of acceleration, i.e., the direction indicated by the arrow B, so that their ends 42 and 52 are in contact with the profiles of the first and second cams 61 and 62, respectively.

The resilient force of the contact springs 4 and 5 on the rotor 6 acts indirectly on the weight 3 so that it is normally in contact with the inner wall 73 of the housing 7 and is restricted from swinging in the direction indicated by the arrow b. Based on this arrangement, the weight 3 and rotor 6 are restricted from swinging in the direction indicated by the arrow a by undergoing the acceleration attributable to hard braking of the vehicle or running on a rough road surface.

The contact spring 5 has the formation of a cut 53 extending in the longitudinal direction from its approximate center to the end 52, thereby having split end sections. The contact spring 5 with the cut 53 enables the reliable electrical contact between the contacts 41 and 51.

The contact springs 4 and 5 are fixed by resin insert molding to the base 8, while being connected electrically with external output terminals 12 and 13, respectively. The external terminals 12 and 13 protrude outwardly from the bottom of the base 8, and the conduction state of the contacts 41 and 51 is led out as a collision detection signal.

Further provided on the base 8 by resin insert molding is a fixing lug 14, by which the collision detection device 100 is mounted on a circuit board or the like (not shown).

On the path of swing motion of the weight 3, a stopper 16 is press-fitted to the inner wall of the cover 9. The weight 3 which hits the stopper 16 following a swing in the a-direction is restricted from swinging beyond a predetermined swing angle.

Next, the operation of the collision detection device 100 will be explained.

When the collision detection device 100 does not undergo the acceleration above a predetermined level in the A-direction, the contact springs 4 and 5 exert the resilient force on the rotor 6 in the B-direction, causing the weight 3 which is integrated with the rotor 6 to stay in contact with the inner wall 73 of the housing 7 by being pressed in the b-direction as shown in FIG. 1(b). That is, the weight 3 is restricted from swinging in the a-direction by the resilient force of the contact springs 4 and 5 and also in the b-direction by the inner wall 73 of the housing 7.

Accordingly, in the absence of acceleration above a predetermined level in the A-direction, the weight 3 does not swing and the rotor 6 does not swing either, causing the contacts 41 and 51 to keep the open state. Consequently, the contacts 41 and 51 are not closed in the presence of acceleration caused by hard braking or the vibration of the vehicle during a run, and the reliability of the collision detection device 100 is ensured.

Figure 3B:
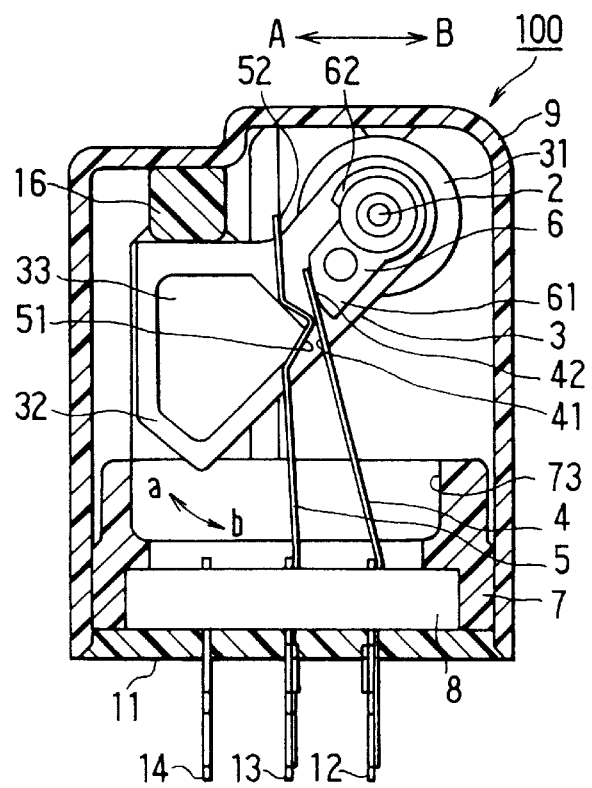
Figure 4A:
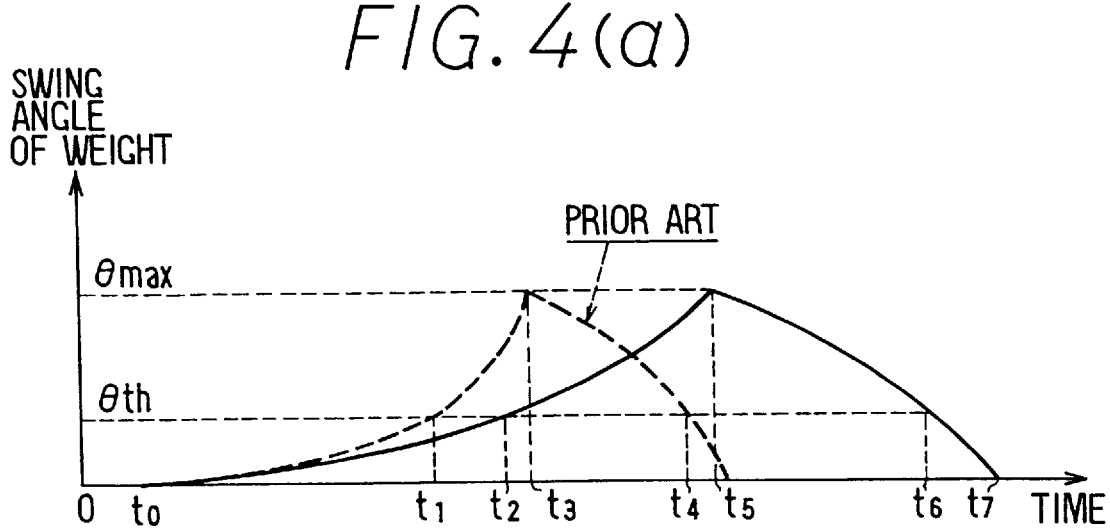
FIGS. 4(a) and 4(b) are charts showing along the time axis the swing angle of a weight and the contact conduction state of the collision detection device according to the first embodiment.
Figure 4B:
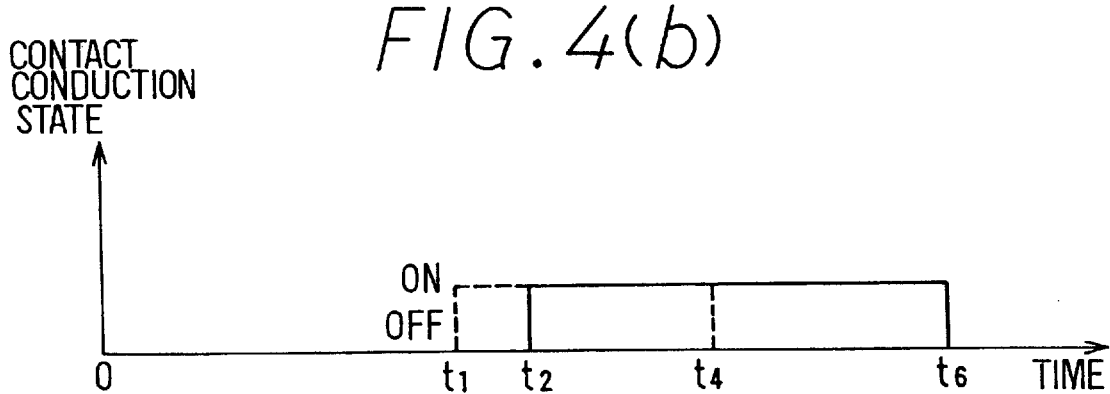

If, on the other hand, the collision detection device 100 undergoes the acceleration above the predetermined level in the A-direction, the contacts 41 and 51 are closed, as will be explained with reference to FIGS. 3(a) and 3(b) and FIGS. 4(a) and 4(b). FIGS. 3(a) and 3(b) show the state of the collision detection device 100, with its weight 3 swinging in the a-direction by undergoing the acceleration and coming in contact with the stopper 16. FIG. 4(a) shows along the time axis the swing angle of the weight 3 in the a-direction in response to the acceleration, and FIG. 4(b) shows the conduction state of the contacts 41 and 51 along the time axis. Shown by the dashed line in FIGS. 4(a) and 4(b) is the behavior of the conventional collision detection device.

When the acceleration of a significant level acts on the weight 3 in the A-direction due to the event of side collision or the like at time point t0, the moment acting on the barycenter of the weight 3 causes the weight 3 and rotor 6 to start to swing in the a-direction about the shaft 2 against the resilient force of the contact springs 4 and 5. The weight 3 has the greater moment of inertia I$_T$ as compared with the conventional counterpart, and therefore it swings slower than the conventional case (less steep slope of the swing rate curve in FIG. 4(a)).

The rotor 6 which swings together with the weight 3 causes its first and second cams 61 and 62 to warp the contact springs 4 and 5, thereby narrowing the distance of the contacts 41 and 51.

When the swing of the weight 3 reaches a predetermined angle θth at time point t2, the rotor 6 closes the contacts 41 and 51 and the current conduction through the output terminals 12 and 13 is detected as a collision detection signal. The weight 3 continues to swing beyond the angle θth in the a-direction until it hits the stopper 16 at the maximum swing angle θmax at time point t5.

The weight 3 bounces on the stopper 16 and swings back in the b-direction toward the original position by being aided by the resilient force of the contact springs 4 and 5. In this case, the weight 3 having a lower swing velocity as compared with the conventional case when it hits the stopper 16 produces a smaller bouncing force, and therefore it swings back slower than the conventional case in the b-direction (less steep slope of the swing rate curve in FIG. 4(a)).

When the weight 3 swings back up to the angle θth at time point t6, the contacts 41 and 51 open, and it further swings back to the original position to come in contact with the inner wall 73 of the housing 7 at time point t7.

The acceleration acting on the collision detection device 100 varies in its amplitude and duration depending on the location of device installation and the direction of collision, and therefore the weight 3 needs to have characteristics that meet individual conditions. For example, in case the collision detection device is installed in the vehicle crash zone or used to detect the incident of side collision, the acceleration of collision acting on the device will have a short duration and large amplitude, and therefore the weight 3 needs to have a larger moment of inertia I$_T$ in order to produce a stable collision detection signal. Otherwise, in case the collision detection device 100 is installed in other location than the vehicle crash zone, the acceleration of collision acting on the device will be relatively small, and the weight 3 suffices to have a smaller moment of inertia I$_T$. Therefore, the weight 3 needs to have a moment of inertia I$_T$ determined arbitrarily to meet individual conditions.

Conventionally, it has been necessary to design the weight by determining the moment of inertia to meet each condition, whereas the weight 3 according to this embodiment allows the easy and arbitrary setting of the moment of inertia I$_T$ to meet individual conditions without varying the eccentric mass moment MR$_T$ based on the provision of the metallic plate (inertial section) 31. The metallic plate 31 of this embodiment is a disc, and its moment of inertia I is expressed by the following formula (3) in terms of the specific gravity γ, radius r and plate thickness T.

$$I=(½)(\pi r^4 T\gamma) \quad (3)$$

That is, the moment of inertia I of the metallic plate 31 is dependent on the specific gravity γ, radius r and thickness T, and by designing only the metallic plate 31 by choosing these values properly, it is fairly possible to obtain a weight 3 having the intended moment of inertia I$_T$ given by the formula (2). The conventional weight having no metallic plate and thus having a smaller moment of inertia behaves to swing faster (steeper slope of the swing rate curve) and produces a shorter duration of closed state of the contacts (from time point t1 to t4) as shown by the dashed line in FIG. 4(a). In contrast, the weight 3 of this embodiment having the metallic plate 31 and thus having a larger moment of inertia I$_T$ can swing slower and can produce a longer duration of closed state of the contacts 41 and 51 (from time point t2 to t6). Moreover, the conventional weight swinging faster produces a larger bouncing force when it hits the stopper, and the resulting reciprocating motion between the stoppers can possibly cause the chattering of collision detection signal and produce an unstable collision detection signal. In contrast, the weight 3 of this embodiment of the invention which behaves to swing slower can reduce the bouncing force on the stopper 16 and inner wall 73, suppressing the reciprocating motion between the stopper 16 and inner wall 73, reducing the chattering of collision detection signal, and producing a stable collision detection signal. By varying the moment of inertia I$_T$ of the weight 3, it is possible to alter the slope of the swing rate curve arbitrarily at least between the solid curve and dashed curve shown in FIG. 4(a). It is not necessary to design and fabricate the whole weight 3 at each alteration of the moment of inertia, and consequently the collision detection device 100 can be manufactured at a lower cost.

It is possible to provide intended characteristics for the collision detection device 100 by properly setting the moment of inertia I$_T$ of the weight 3. The spring force produced by the contact springs 4 and 5 is a function of the swing angle θ, i.e., F(θ), of the weight 3, and the following equation (4) holds during a swinging period of the swinging weight 3.

$$d^2\theta/dt^2=(MR_T G-F(\theta)rf)/I_T \quad (4)$$

where rf is the distance between the acting position of the spring force F(θ) and the swing axis of the weight 3, and G is the acceleration acting on the weight 3.

The equation (4) reveals that the angular acceleration $d^2\theta/dt^2$ of the weight 3 is a function of the ratio of the eccentric mass moment MR$_T$ to the moment of inertia I$_T$, and accordingly the operational characteristics of the collision detection device 100 are dependent on the value of MR$_T$/I$_T$.

Figure 5:
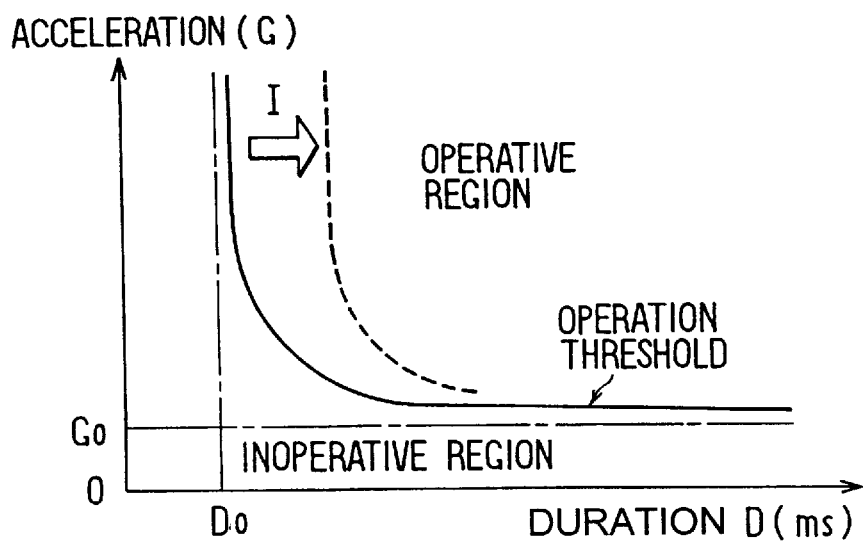
FIG. 5 is a chart showing the actuation region of the collision detection device of the first embodiment in terms of the relation between the amplitude and period of acceleration acting on the device.

FIG. 5 shows the actuation region (conduction state of the contacts 41 and 51) of the collision detection device 100 in terms of the relation between the amplitude and duration of the acceleration acting on the device. The area above the amplitude/period curve is the operative region and the area below the curve is the inoperative region. The amplitude/period curve having a vertical asymptotic line at acceleration period D0 and a horizontal asymptotic line at acceleration amplitude G0 represents the operation threshold characteristics. The D0 is the lower limit of acceleration duration needed to close the contacts, and it depends on the ratio of the eccentric mass moment MR$_T$ to the moment of inertia I$_T$, i.e., MR$_T$/I$_T$, of the weight 3.

The point D0 moves to the left as the value of MR$_T$/I$_T$ increases on the chart of FIG. 5. Since the eccentric mass moment MR$_T$ of the weight 3 is unvarying irrespective of the addition of the metallic plate 31, the value of D0 is solely dependent on the moment of inertia I$_T$ of the weight 3. That is, the D0 moves to the left as the moment of inertia I$_T$ is decreased, and it moves to the right as the I$_T$ is increased.

Accordingly, it is possible to set the operational characteristics (response to duration of acceleration impulse) of the weight 3 arbitrarily to meet the condition of use by setting the moment of inertia I of the metallic plate 31 properly so that the weight 3 is prevented from swinging in the presence of acceleration below the predetermined duration. Particularly, by providing the weight 3 with a relatively large moment of inertia IT and a relatively small eccentric mass moment MRT, it becomes possible to use the collision detection device 100 as a crash sensor which detects the incident of collision directly.

The point G0 which gives the horizontal asymptotic line of the chart of FIG. 5 represents the acceleration in static equilibrium. Setting $d^2\theta/dt^2=0$ in equation (4) gives G0=F($\theta$)rf/MRT, and accordingly it reveals that the G0 is dependent on the eccentric mass moment MRT and spring force F($\theta$). The acceleration G0 of static equilibrium signifies the threshold of detection, and it is determined in advance from the required performance of the collision detection device 100. The acceleration G0 of static equilibrium is unvarying irrespective of the value of moment of inertia I of the metallic plate 31, and it is possible for the collision detection device 100 of this embodiment to have its operational characteristics altered while retaining a constant threshold of detection. That is, by adjusting the moment of inertia I of the metallic plate 31 so as to set the intended moment of inertia IT without varying the eccentric mass moment MRT of the weight 3, it is possible to accomplish the intended operational characteristics of the collision detection device 100 at the time of prototype manufacturing.

Although the weight 3 of the foregoing embodiment is designed to lower the swing velocity by increasing the moment of inertia I of the metallic plate 31, demands of quick response can be met by reducing the moment of inertia I of the metallic plate 31 thereby to provide a smaller moment of inertia IT for the weight 3.

In providing the metallic plate 31 of the foregoing embodiment with an arbitrary moment of inertia I by choosing its specific gravity γ, radius r or thickness T, through a number of metallic plates of the same shape (radius r and thickness T) are used but different materials (different specific gravity γ) may be used, thereby allowing selective use for individual purposes.

Although the metallic plate 31 of the foregoing embodiment is formed of a unitary member, it may consist of multiple detachable divisions. For example, the metallic plate 31 is formed of a certain number of ring-shaped divisions assembled coaxially, thereby amounting to an intended moment of inertia I.

Although the metallic plate 31 of the foregoing embodiment is made of metal, it may be of other material such as resin.

Although the metallic plate 31 of the foregoing embodiment is a disc-shaped plate, it may be a square plate, rectangular plate or elongated circular plate, provided that its swing axis is coincident with the barycenter.

Although the eccentric mass 32 of the foregoing embodiment is made of resin, it may be formed of other material, provided that its swing axis is eccentric from the barycenter.

Although the metallic plate 31 and eccentric mass 32 of the foregoing embodiment are joined by resin insert molding, these parts may be joined by other manner such as caulking or bonding.

Although the weight 3 and rotor 6 of the foregoing embodiment are supported to swing freely about the shaft 2, an alternative structure is to fix the weight 3 and rotor 6 to the shaft 2, which is supported rotatably by bearings provided on the housing 7.

Although the metallic plate 31 and eccentric mass 32 of the foregoing embodiment are joined by resin insert molding, an alternative structure is to fix these parts separately to the shaft 2, which is supported rotatably by bearings provided on the housing 7.

Although the contacts 41 and 51 of the foregoing embodiment are integral parts of the contact springs 4 and 5, respectively, an alternative structure is to arrange the contacts separately from the contact springs, with the conduction state of the contacts being varied by the movement of the contact springs.

Although the weight 3 of the foregoing embodiment is subjected to the exertion of the resilient force of the contact springs 4 and 5, an alternative structure is to exert a resilient force of a coil spring or the like to the weight 3 against the swing motion caused by the impact of collision, with a contact being formed on the surface of the weight 3 against a fixed contact so that these contacts make or break the conduction by sliding.

Although the contacts of the foregoing embodiment are normally open and they close in response to the acceleration above a certain level, the contacts may be of normally-closed type so that they open in response to the acceleration above a certain level.

As described above, the collision detection device according to the first embodiment has its pendulum formed of an eccentric section having an eccentric mass moment and an inertial section having no eccentric mass moment joined together mechanically, allowing the easy setting of the moment of inertia of the pendulum by the adjustment of the moment of inertia of the inertial section, while leaving the eccentric mass moment of the whole pendulum unvarying, thereby to be adapted to various operational conditions including the type of vehicle, device installation location, and collision sensitive direction, whereby it is capable of producing a stable collision detection signal and enabling the cost reduction.

(Second Embodiment)

Figure 6A:
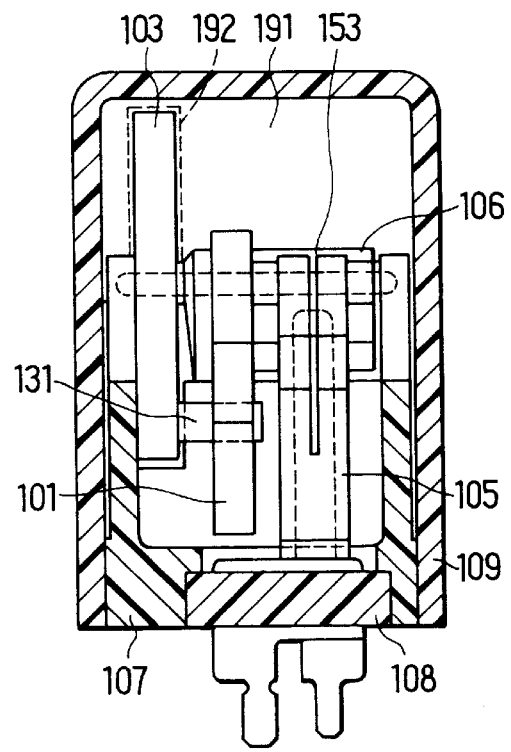
FIGS. 6(a) and 6(b) are cross-sectional views showing internal structure of a collision detection device according to a second embodiment of this invention.
Figure 6B:
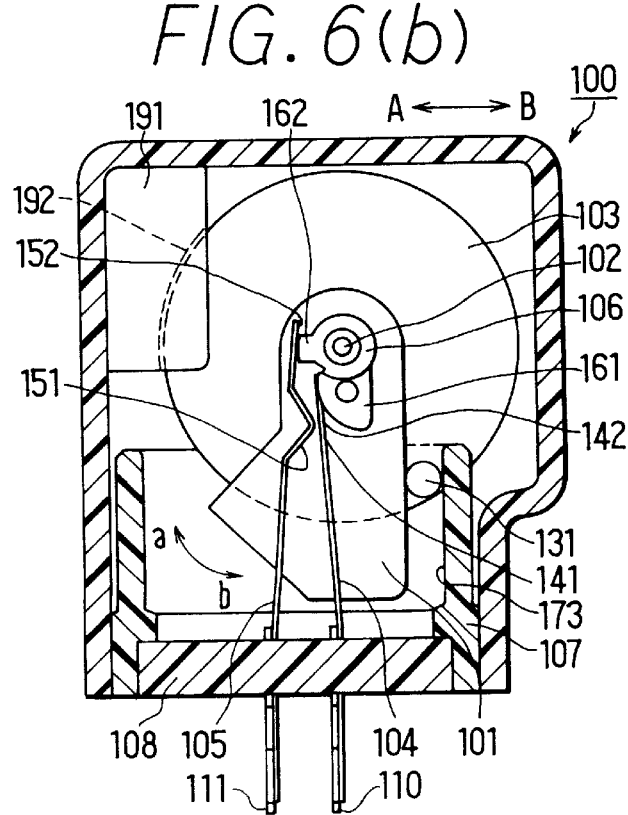

As shown in FIGS. 6(*a*), 6(*b*) and 7, a collision detection device 100 of this embodiment has its contacts 141 and 151 being open in the absence of acceleration above a certain level. The collision detection device 100 has a collision sensitive direction indicated by the arrow A, and has its first weight 101 as an eccentric mass and a second weight 103 as an inertial mass adapted to swing in the direction indicated by the arrow a (first direction) in response to the impact of collision.

The collision detection device 100 has a cover 109 made of resin, a base 108 of flat plate, and a housing 107. The base 108 is press-fitted to the housing 107, and the housing 107 is press-fitted to the cover 109.

The housing 107 has a base section 172 and a pair of confronting stem sections 170*a* and 170*b*, which have the formation of cuts 171*a* and 171*b* at the top. A shaft 102 is fixed at its both ends to the cuts 171*a* and 171*b* of the stem sections, and a first weight 101 having its swing axis eccentric from the barycenter is held by the shaft 102 to swing about it.

The first weight 101 is made in a disc-shaped metallic plate, on which is formed a rotor (cam rotor) 106 of resin mold, which shares the shaft 102 with the first weight 101. The rotor 106 can swing about the shaft 102 together with the first weight 101, and it has a first cam 161 and second cam 162.

A disc-shaped second weight 103 is held by the shaft 102 by adjoining the first weight 101. At the rim of the second weight 103 on the side of the first weight 101, there is press-fitted a first pin 131 which is generally circular in cross section and long enough to reach the first weight 101. The first pin 131 is located in the housing 107 so that it is between the first weight 101 and the inner wall (stopper) 173 of the housing 107.

The first weight 101, with its eccentric mass moment and moment of inertia being mr and i, and the second weight 103, with its eccentric mass moment and moment of inertia being MR and I, are designed to relate in terms of these parameters as follows.

$$mr/i \gg MR/I \qquad (5)$$

As expressed by the formula (5), the first weight 101 has a greater ratio of the eccentric mass moment to the moment of inertia relative to the second weight 103. The collision detection device has its response speed determined by the moment of inertia of the weight and its sensitivity determined by the eccentric mass moment. Accordingly, with the acceleration of a certain amplitude and duration (medium frequency band) acting on the first and second weights 100 and 103 in the direction indicated by the arrow A in FIG. 6(b), the first weight 101 swings faster than the second weight 103 in the direction indicated by the arrow a.

Contact springs (leaf springs) 104 and 105 having respective contacts 141 and 151 in their end sections are fixed to stand by being spaced out from each other on the base 108. The contact 141 is formed at a flat section of the spring 104, while the contact 151 is formed at a section of the spring 105 which is bent to protrude toward the contact 141. The contact springs 104 and 105 are in contact at their ends with the profiles of the first and second cams 161 and 162, respectively, and exert resilient forces on the rotor 106 in the direction opposite to the direction of swing motion caused by the acceleration, i.e., the direction indicated by the arrow B. The resilient forces of the contact springs 104 and 105 on the rotor 106 act indirectly on the first weight 101 in the B-direction, restricting the first weight 101 and rotor 106 from swinging in the presence of acceleration attributable to hard braking or running on a rough road surface of the vehicle.

The contact spring 105 has the formation of a cut 153 which extends in the longitudinal direction from its approximate center to the end 152, and the resulting split end sections enable the reliable electrical contact between the contacts 141 and 151.

The contact springs 104 and 105 are fixed to the base 108, while being connected electrically with external output terminals 110 and 111, respectively. The output terminals 110 and 111 protrude outwardly from the bottom of the base 108, and the conduction state of the contacts 141 and 151 is led out as a collision detection signal.

On the path of swing motion of the first weight 101, there is disposed a stopper (swing limiting member) 191 on the inner wall of the cover 109. The first weight 101 which hits the stopper 191 following a swing in the a-direction is restricted from going beyond a predetermined swing angle. The stopper 191 has the formation of a groove 192 so as to allow the motion of the second weight 103.

Next, the operation of the collision detection device 100 will be explained.

In the absence of the acceleration above a certain level acting on the collision detection device 100, the contact springs 104 and 105 exert resilient forces on the rotor 106 in the B-direction, causing the first weight 101 which is integrated with the rotor 106 to press the first pin 131 in the B-direction. The first pin 131 is held between the first weight 101 and the inner wall 173 of the housing 107, and the swing motion of the second weight 103 is inhibited in any of the a-direction and b-direction (second direction).

That is, in the absence of the acceleration above a certain level in the A-direction, both the first weight 101 and second weight 103 do not swing and the contacts 141 and 151 keep the open state. Accordingly, the contacts 141 and 151 are not closed by the acceleration attributable to the vibration or hard braking of the vehicle, whereby erroneous detection of collision by the collision detection device 100 can be prevented.

Figure 8A:
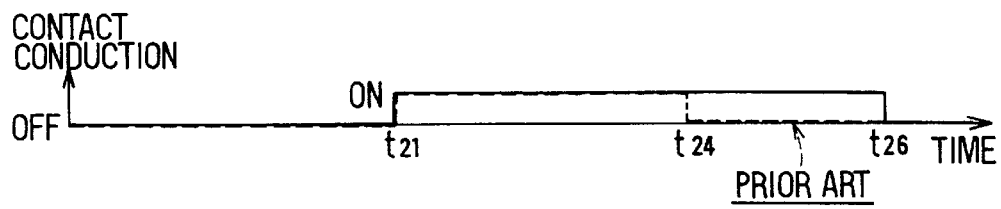
FIGS. 8(a) through 8(f) are charts and schematic views showing the operation of the collision detection device of the second embodiment.
Figure 8B:
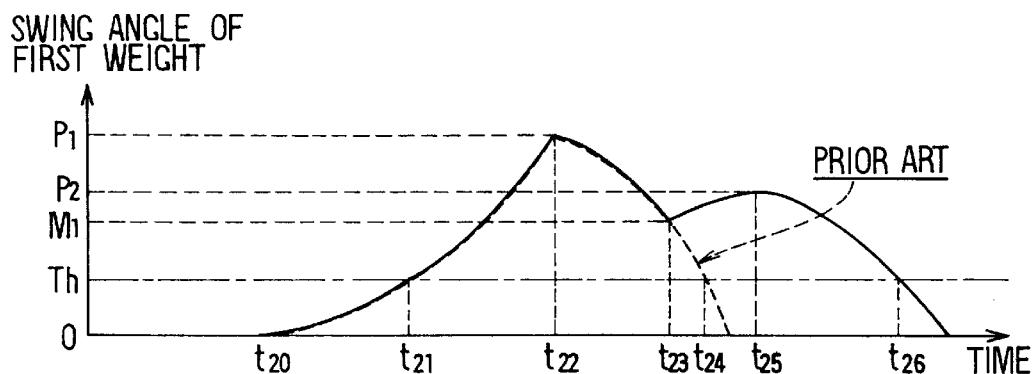
Figures 8C, 8D, 8E, 8F:
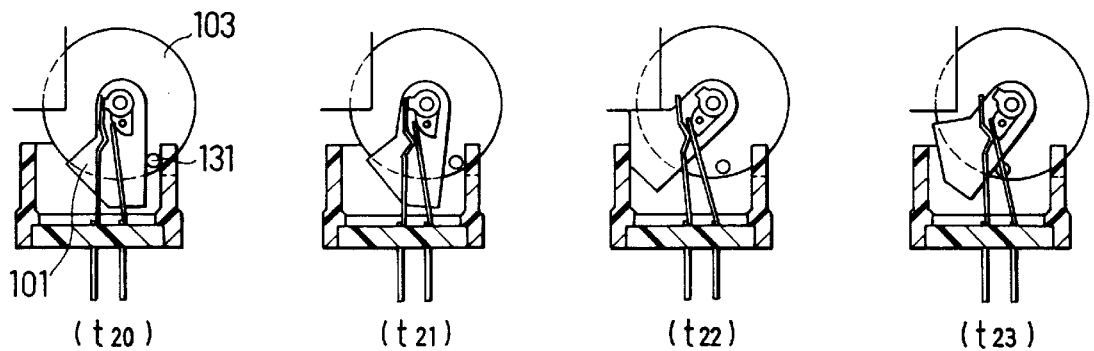

On the other hand, if the acceleration above a certain level acts on the collision detection device 100 in the B-direction, i.e., on the first weight 101 in the A-direction, the contacts 141 and 151 will be closed, as will be explained with reference to FIGS. 8(a) through 8(f). FIGS. 8(a) and 8(b) show along the time axis the collision detection signal and swing angle of the first weight 101, respectively, with the first weight 101 being initially at zero swing angle, resulting from the acting acceleration having medium duration components. Shown by the dashed line is the result of the conventional device. FIGS. 8(c) through 8(f) show the swing of the first weight 101, the position of the first pin 131 and the state of the contact springs 104 and 105 at time points t20, t21, t22 and t23.

When the acceleration above a certain level acts on the first and second weights 100 and 103 in the A-direction at time point t20, the moment acting on the mass barycenter of the weights causes the weights and the rotor 106 to begin to swing in the a-direction about the shaft 102 against the resilient forces of the contact springs 104 and 105. The turning rotor 106 causes its first and second cams 161 and 162 to warp the contact springs 104 and 105 to narrow their distance.

When the swing of the first weight 101 reaches the predetermined threshold angle Th at time point t21, the rotor 106 closes the contacts 141 and 151, and the current conduction through the output terminals 110 and 111 is detected as a collision detection signal.

Based on the relation of the formula (5) of the first and second weights 100 and 103, the second weight 103 swings much slower than the first weight 101.

The first weight 101 continues to swing beyond the threshold angle Th in the a-direction until it hits the stopper 191 at the maximum swing angle P1 at time point t22. The first weight 101 bounces on the stopper 191 and swings back in the b-direction toward the original position by being aided by the resilient forces of the contact springs 104 and 105.

The swing angle of the first weight 101 decreases progressively, and when it approaches the threshold angle Th and has a value of M1 at time point t23, it is pushed by the first pin 131 which has followed the swing of the first weight 101 in the a-direction and driven to swing in the a-direction again. Consequently, the first weight 101 has its swing angle increasing again to have the second peak P2 at time point t25. After that, the swing angle of the first weight 101 decreases gradually and causes the contacts 141 and 151 to open when it comes down below the threshold angle Th at time point t26. The swing angle of the first weight 101 decreases until it returns to the original position. The timing of contact of the first pin 131 to the first weight 101 is not crucial, provided that it precedes the opening of the contacts 141 and 151 (at swing angle Th of the first weight 101).

Conventionally, the weight swings as shown by the dashed line in FIG. 8(b), closing the contacts at time point t24 to produce the duration of closed state from time point t21 to t24. In contrast, the arrangement of this embodiment produces the duration of closed state from time point t21 to t26 which is extended by the time length t24–t26, and it can produce a stable collision detection signal.

The collision detection device 100 is responsive satisfactorily to the acceleration of different durations, as will be explained with reference to FIGS. 9(a)–9(g), FIGS. 10(a)–10(g) and FIGS. 11(a)–11(f).

FIG. 9(a) shows the waveform of the acceleration acting on the collision detection device 100 installed on the side of the vehicle when the impact of collision is directly on the device. FIG. 9(b) shows the collision detection signal produced by the device in this incident, and FIG. 9(c) shows the swing angle of the first weight 101 along the time axis. FIGS. 9(d), 9(e) and 9(f) show the swing of the first weight 101, the position of the first pin 131 and the state of the contact springs 104 and 105 at time points t40, t41, t42 and t43. Shown by the dashed line in FIGS. 9(b) and 9(c) is the result of the conventional device.

In this case of the direct impact of collision on the collision detection device 100, as shown in the FIG. 9(a), the acceleration acting on the device is great (peak value of G2) and has short duration components, and it diminishes in a short time (duration of D1). At time point t40 when the acceleration G1 above a predetermined extent acts on the first weight 101 in the A-direction, the first weight 101 and rotor 106 begin to swing in the a-direction about the shaft 102 against the resilient forces of the contact springs 104 and 105, and the rotor 106 warps the contact springs to narrow their distance.

At time point t41 when the swing angle of the first weight 101 reaches the threshold angle Th, the rotor 106 closes the contacts 141 and 151. The resulting current conduction caused by the closed contacts is detected through the output terminals 110 and 111 as a collision detection signal.

The first weight 101 continues to swing in the a-direction until it hits the stopper 191 and has the maximum swing angle P1 at time point t42. The first weight 101 bounces on the stopper 191 and swings back in the b-direction toward the original position by being aided by the resilient force of the contact springs 104 and 105. The swing angle of the first weight 101 decreases progressively, and when it comes down below the threshold angle Th at time point t43, the contacts 141 and 151 open. The swing angle further decreases down to the original state.

Accordingly, when the first weight 101 swings in the a-direction by the acceleration of a large extent and short duration components, there is a great difference of swing velocity between the first weight 101 and the second weight 103 which is less responsive to the high frequency components and swings little so that the first pin 131 does not interfere with the first weight 101, and the collision detection device 100 is responsive at a satisfactory timing to close the contacts 141 and 151.

FIG. 10(a) shows the waveform of the acceleration acting on the collision detection device 100 when the impact of collision is near the device. FIG. 10(b) shows the collision detection signal produced by the device in this incident, and FIG. 10(c) shows the swing angle of the first weight 101 along the time axis. FIGS. 10(d), 10(e) and 10(f) show the swing of the first weight 101, the position of the first pin 131 and the state of the contact springs 104 and 105 at time points t50, t51, t52 and t53. Shown by the dashed line in FIGS. 10(b) and 10(c) is the result of the conventional device.

In this case of the impact of collision near the collision detection device 100, as shown in the FIG. 10(a), the acceleration acting on the device is smaller than the previous case shown in FIG. 9(a) (peak value of G3; G3<G2) and has medium duration components, and it diminishes slower (duration of D2; D2>D1). The behavior of the collision detection device 100 when the acceleration G1 above a predetermined level acts on it in the A-direction at time point t50 is identical to the previous case shown in FIGS. 9(a)–9(d). That is, the first weight 101 and rotor 106 begin to swing in the a-direction about the shaft 102 against the resilient forces of the contact springs 104 and 105, and the rotor 106 closes the contacts 141 and 151 when the swing angle of the first weight 101 reaches the threshold angle Th at time point t51.

The first weight 101 hits the stopper 191 and has the maximum swing angle P1 at time point t52, and it bounces on the stopper 191 and swings back toward the original position. At time point t53 immediately before the swing angle decreases to the threshold angle Th, the second weight 103 which swings slower meets the first weight 101 and causes it to turn in the a-direction again until it takes the second peak P3 at time point t55. After that, the first weight 101 swings back in the b-direction, crosses the threshold angle Th, causing the contacts 141 and 151 to open at time point t56, and returns to the original position.

Accordingly, the collision detection device 100 is responsive satisfactorily to the acceleration of collision of a small amplitude and low frequency components relative to the previous case of FIGS. 9(a)–9(g).

FIG. 11(a) shows the waveform of the acceleration acting on the collision detection device 100 when the impact of collision is far from the device. FIG. 11(b) shows the collision detection signal produced by the device in this incident, and FIG. 11(c) shows the swing angle of the first weight 101 along the time axis. FIGS. 11(d), 11(e) and 11(f) show the swing of the first weight 101, the position of the first pin 131 and the state of the contact springs 104 and 105 at time points t60, t61, t62 and t63. Shown by the dashed line in FIGS. 11(b) and 11(c) is the result of the conventional device.

In this case of the impact of collision far from the collision detection device 100, as shown in the FIG. 11(a), the acceleration acting on the device is much smaller than the previous case (peak value of G5; G5<G3) and has long duration components, and it diminishes much slower (duration of D3; D3>D2). The second weight 103 having the greater mass moment begins to swing in response to acceleration G4 above a predetermined level which is smaller than G1 in the A-direction at time point t60. The peak acceleration G5 shown in FIG. 11(a) is smaller than G1, and therefore only the second weight 103 responds. Accordingly, the second weight 103 and the first weight 101 which is pushed by the first pin 131 begin to swing in the a-direction about the shaft 102 against the resilient forces of the contact springs 104 and 105. The second weight 103 having a greater moment of inertia swings slowly in the presence of the acceleration above G4.

When the swing angle of the first weight 101 reaches the threshold angle Th at time point t61, the rotor 106 closes the contacts 141 and 151.

The first weight 101 and second weight 103 continue to turn beyond the threshold angle Th, but do not reach the stopper 191 due to the smaller acceleration. After taking the maximum swing angle P4 at time point t62, the first weight 101 swings back in the b-direction toward the original position and the swing angle decreases progressively. When the swing angle comes down below the threshold angle Th at time point t63, the contacts 141 and 151 open. The swing angle further decreases down to the original position.

The conventional collision detection device, in which the weight is not accompanied by a second weight and the swing angle does not reach the threshold angle Th in response to the acceleration of low frequency components, is not sensitive to the impact of collision of this type. In contrast, providing the second weight 103 which is responsive to the long duration acceleration based on this embodiment enables the first weight 101 to swing by being coupled to the second weight 103 to the extent enough to reach the threshold angle Th, and the collision detection device of this embodiment is capable of detecting the incident of collision of this type. The lower swing velocity of the first weight 101 as compared with the preceding cases of FIGS. 9(a)–9(g) and FIGS. 10(a)–10(g) meets the requirement of later activation of the safety device in response to the acceleration caused by the incident of collision of this type.

As described above, the collision detection device of this embodiment is capable of detecting the impact of collision at the proper timing in any case of the acceleration of collision having only short duration components, including medium duration components, and having only long duration components.

(Third Embodiment)

In contrast to the second embodiment in which the first pin 131 provided on the second weight 103 comes in contact with the first weight 101 after the weight has hit the stopper 191 and bounced, a collision detection device of the third embodiment has the additional provision of a second pin 132, and is designed such that the first weight 101 which swings in response to the impact of collision comes in contact with it.

Figure 12A:
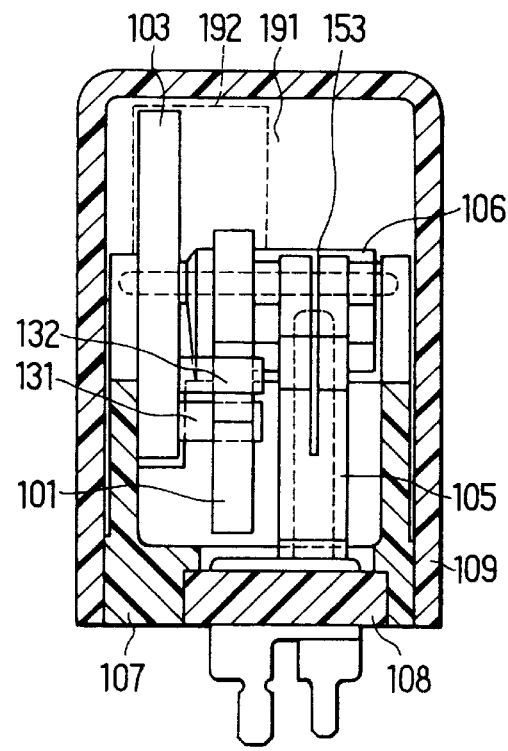
FIGS. 12(a) and 12(b) are cross-sectional views showing internal structure of a collision detection device according to a third embodiment of this invention.
Figure 12B:
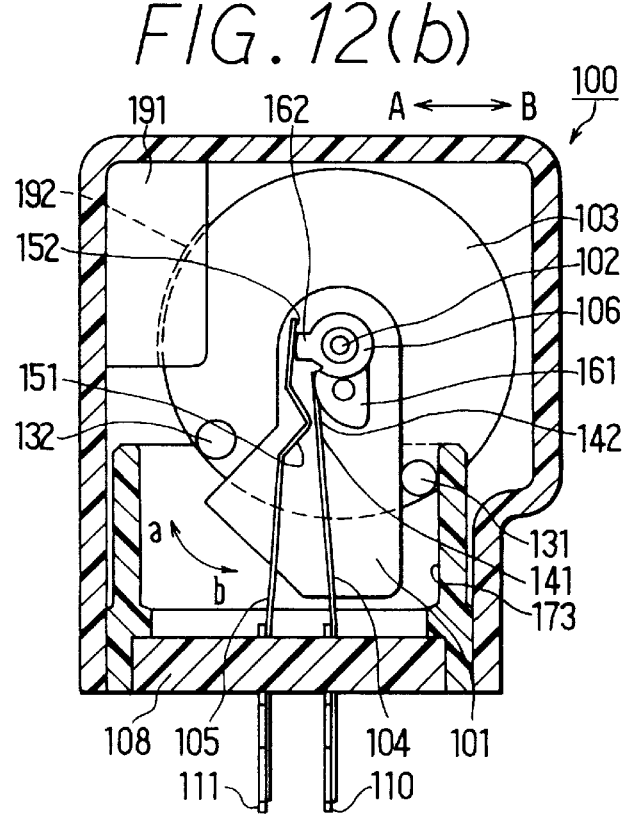

As shown in FIGS. 12(a) and 12(b), at the rim of the second weight 103 on the side of the first weight 101, there are press-fitted a first pin 131 and second pin 132 of generally the same shape by being spaced out from each other. The second pin 132 is located at the position of a certain advanced swing angle in the a-direction relative to the first weight 101.

The first weight 101 which swings in the a-direction hits the stopper 191, which has the formation of a groove 192 so as not to allow the second weight 103 and second pin 132 to hit the stopper 191.

Next, the operation of the collision detection device 100 will be explained.

In the absence of the acceleration above a certain level acting on the collision detection device 100, the contact springs 104 and 105 exert resilient forces on the rotor 106 in the B-direction, causing the first weight 101 which is integrated with the rotor 106 to hold the first pin 131 between it and the inner wall 173 of the housing 107, and the swing motion of the second weight 103 is inhibited in any of the a-direction and b-direction, as in the case of the second embodiment. At this time, the second pin 132 is clear of the first weight 101 and stopper 191.

Accordingly, the contacts 141 and 151 are not closed by the acceleration attributable to the vibration or hard braking of the vehicle, whereby erroneous detection of collision by the collision detection device 201 can be prevented, as in the case of the second embodiment.

On the other hand, if the acceleration above a certain level acts on the first weight 101 in the A-direction, the contacts 141 and 151 will be closed. The operation of the collision detection device 201 in response to the acceleration having low or medium duration components will be explained with reference to FIGS. 13(a) through 13(f).

Figure 13A:
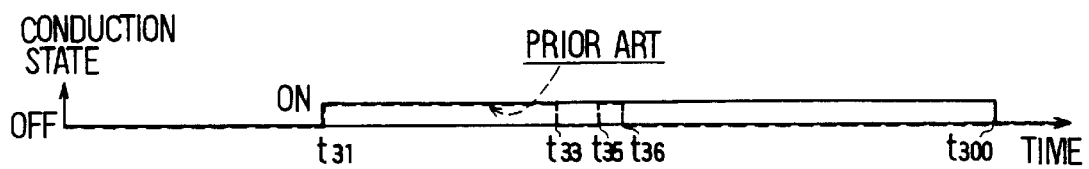
FIGS. 13(a) through 13(f) are charts and schematic views showing the operation of the collision detection device of the third embodiment.
Figure 13B:
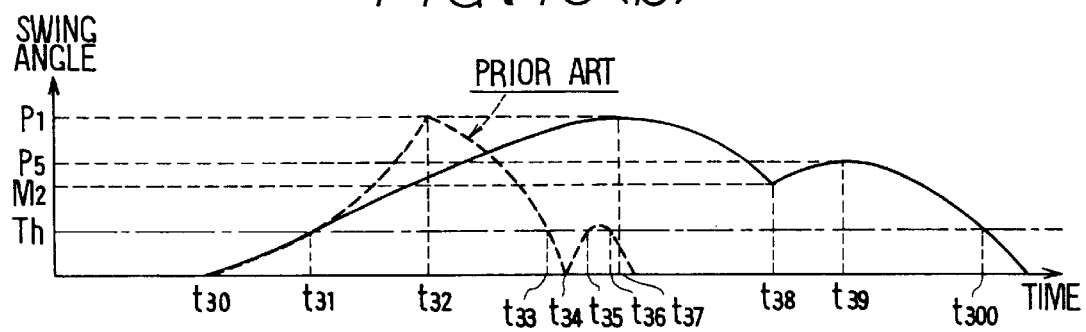
Figures 13C, 13D, 13E, 13F:
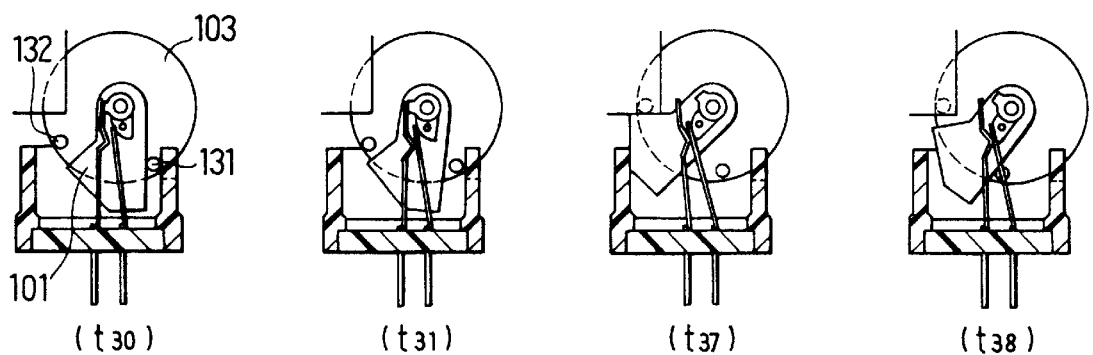

FIGS. 13(a) and 13(b) show along the time axis the collision detection signal and swing angle of the first weight 101, respectively. Shown by the dashed line is the result of the conventional device. FIGS. 13(c) through 13(f) show the swing of the first weight 101, the position of the first and second pins 131 and 132, and the state of the contact springs 104 and 105 at time points t10, t11, t17 and t18.

When the acceleration above a certain level acts on the first weight 101 in the A-direction at time point t30, the moment acting on the barycenter of the weight causes it and the rotor 106 to begin to swing in the a-direction about the shaft 102 against the resilient forces of the contact springs 104 and 105. The turning rotor 106 causes its first and second cams 161 and 162 to warp the contact springs 104 and 105 to narrow their distance.

Once the first weight 101 begins to swing in the a-direction at time point t30, the second weight 103 is freed to swing by being relieved of the force on its first pin 131 exerted by the first weight 101.

When the swing of the first weight 101 reaches the predetermined threshold angle Th at time point t31, the rotor 106 closes the contacts 141 and 151. At this time, the first weight 101 pushes the second pin 132 to turn the second weight 103 by releasing the kinetic energy. Accordingly, the first weight 101 has its swing velocity slowing down, resulting in a less steep swing rate curve shown in FIG. 13(b) as compared with the conventional device following the conduction of the contacts 141 and 151.

The first weight 101 continues to swing beyond the threshold angle Th in the a-direction until it hits the stopper 191 at the maximum swing angle P1 at time point t37. The first weight 101 bounces on the stopper 191 and swings back in the b-direction toward the original position by being aided by the resilient forces of the contact springs 104 and 105.

Whereas, the second weight 103 which does not hit the stopper 191 retains the angular velocity of the time when the first weight 101 has hit the stopper 191.

The swing angle of the first weight 101 decreases progressively, and when it approaches the threshold angle Th to have a value of M2 at time point t38, it is pushed by the first pin 131 to swing in the a-direction. By being driven by the first pin 131, the first weight 101 has its swing angle increasing again to take the second peak P5 at time point 539. After that, the swing angle of the first weight 101 decreases to come down below the threshold angle Th at time point t300, and finally returns to the original position.

Consequently, the collision detection device of this embodiment has an extended time length after the swing angle of the first weight 101 reaches the threshold angle Th until it takes the peak value P3, and also has an extended time length from the peak value P3 to the threshold angle Th, whereby it can have a longer duration of closed state of the contacts 141 and 151.

Since the first weight 101 is free from the forces of the first and second pins 131 and 132 before the contacts 141 and 151 are closed, the device is as highly responsive as the second embodiment.

The weight of the conventional device having a greater swing velocity when it hits the stopper swings back faster (steeper swing rate curve), and it bounces on the inner wall 173 at time point t34 to swing again in the a-direction beyond the threshold angle Th at time point t35 as shown by the dashed line in FIG. 13(b), causing the contacts 141 and 151 to make intermittently in periods from time point t31 to t33 and from time point t35 to t36. Whereas, according to the collision detection device 100 of this embodiment, the first weight 101 has its swing back velocity lowered enough to prevent the chattering of contacts, and it can produce a continuous collision detection signal.

In the case of the acceleration of collision of long duration components, the first and second weights 101 and 103 swing in a coupled state to close the contacts 141 and 151, as in the case of the second embodiment. In case the device is solely intended to be responsive to the acceleration of high or medium frequency components and have an extended duration of closed state, the second weight 103 does not need to be eccentric.

Although in the foregoing third embodiment the second pin 132 is designed to become in contact with the first weight 101 when the contacts 141 and 151 are closed, this timing is not crucial, provided that it is after the closing of the contacts 141 and 151.

In the foregoing third embodiment, if the first weight 101 slows down effectively by coming in contact with the second pin 132, the arrangement may be modified to relieve the first weight 101 of coming in contact with the first pin 131 when it swings back in the b-direction.

(Fourth Embodiment)

Figure 14A:
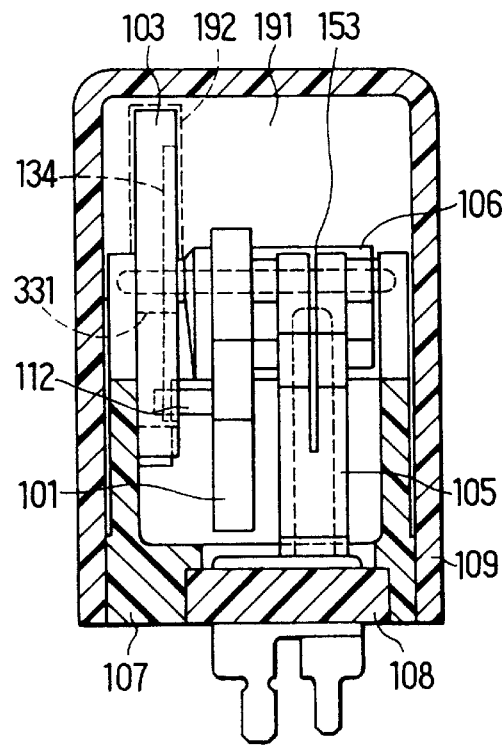
FIGS. 14(a) and 14(b) are cross-sectional views showing internal structure of a collision detection device according to a fourth embodiment of this invention.
Figure 14B:
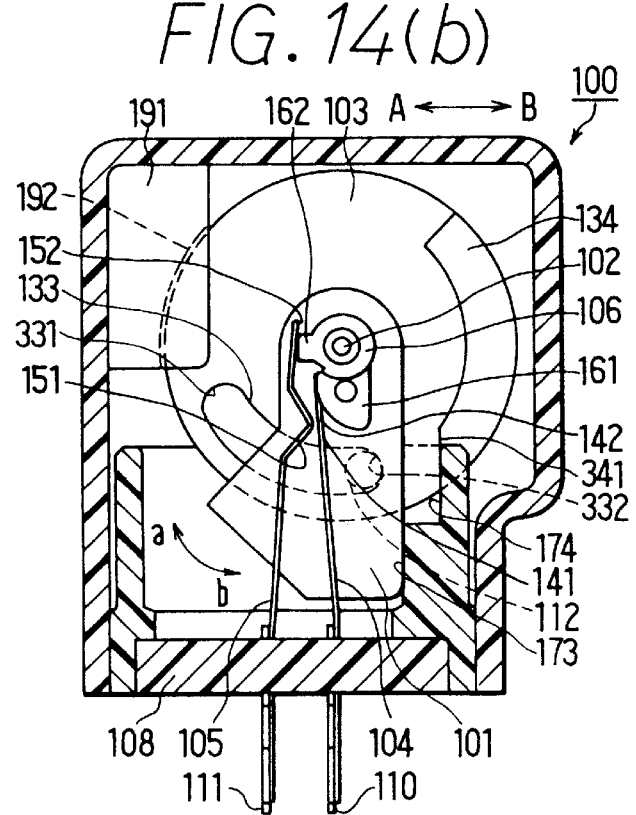

In contrast to the second and third embodiments in which the second weight 103 is pushed in the b-direction by being driven at its first pin 131, a collision detection device of the fourth embodiment has the provision of a pin (boss) 112 on the first weight 101 so that it drives the second weight 103 in the b-direction, as shown in FIGS. 14(a) and 14(b).

The first weight 101 is pushed through the rotor 106 in the B-direction by the contact springs 104 and 105, so that it is in contact with the inner wall 173 of the housing 107. On the first weight 101 on the side of the second weight 103, there is press-fitted a pin 112 having its end engaged with an arcuate opening 133 formed in the second weight 103. The opening 133 has one end (first end) 331 and another end (second end) 332 at the position of a certain advanced swing angle in the a-direction from the first end 331, and the swing motion of the second weight 103 in the a-direction is inhibited when the pin 112 comes in contact with the second end 332.

The second weight 103 has the formation of a recess 134 in a certain circumferential section on the side of the first weight 101, with one end 131 being in contact with the inner wall 174 of the housing 107. Accordingly, the swing motion of the second weight 103 in the b-direction is inhibited when the end 134 of recess 131 comes in contact with the inner wall 174. The ends 331 and 332 of the opening 133 function similarly to the second pin and first pin, respectively. The recess 134 and opening 133 are formed so that the second weight 103 retains the predetermined eccentricity of the swing axis from the barycenter.

The stopper 191 having the formation of the groove 192 for limiting the swing of the first weight 101 in the a-direction used in the second embodiment is also provided for this embodiment.

The collision detection device 100 arranged as shown in FIGS. 14(a) and 14(b) attains the same advantages as the second and third embodiments. Specifically, by designing the first weight 101 and second weight 103 to meet the formula (5) and by determining the length of the opening 133 such that the pin 112 does not come in contact with the end (second end) 331 during the swing of the first weight 101, there is no counter force against the swing motion of the first weight 101 in the a-direction caused by the acceleration acting on it.

After the first weight 101 hits the stopper 191 and swings back in the b-direction and before the swing motion varies the conduction state of the contacts again, the second weight 103 which swings slower has its end 341 of recess 134 meeting the first weight 101, thereby slowing down the swing motion of the first weight 101. In this manner, the same advantage as the second embodiment is attained.

By determining the length of the opening 133 such that the pin 112 comes in contact with the end 331 after the conduction state of the contacts has varied by the swing motion of the first weight 101 in response to the acceleration of low or medium duration components, the first weight 101 undergoes the counter force against its swing motion in the a-direction and can have its swing velocity lowered before it hits the stopper 191. After the first weight 101 hits the stopper 191 and swings back in the b-direction and before the swing motion varies the conduction state of the contacts again, the pin 112 meets the end 322 of the opening 133 so that the swing motion of the first weight 101 can be further reduced. In this manner, the same effectiveness as the third embodiment is attained.

The second weight 103 responds to the acceleration of long duration components, while the first weight 101 does not. Based on the contact of the pin 112 with the end 332, the first weight 101 swings with the second weight 103, whereby the device is responsive satisfactorily to the acceleration of long duration components. In case the device is solely intended to be responsive to the acceleration of low or medium durations, the second weight 103 does not need to be eccentric.

Although the foregoing second through fourth embodiments are designed to extend the duration of closed state of the contacts based on the exertion of a counter force against the swing motion of the first weight 101, an alternative manner is to exert a force directly against the swing motion of the rotor 106.

Figure 7:
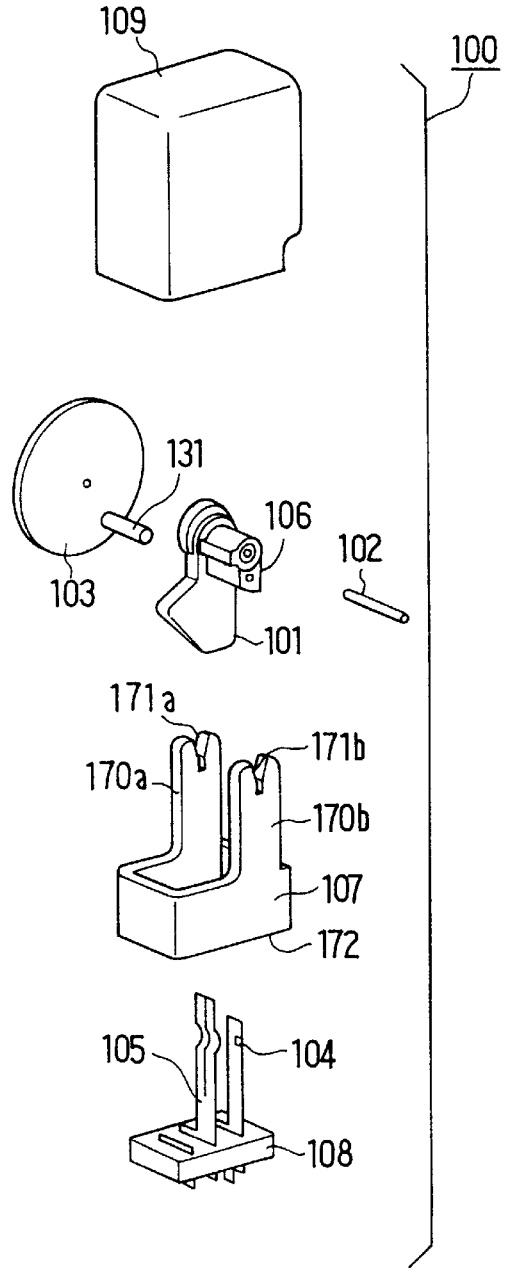
FIG. 7 is an exploded view showing the assembly of the component parts of the collision detection device of the second embodiment.

Although in the foregoing embodiments the first weight 101, second weight 103 and rotor 106 are supported to swing freely about the shaft 102, an alternative structure is to fix these members to the shaft 102, which is supported rotatably by bearings provided on the stems 170a and 170b (FIG. 7) of the housing 107.

Although the contacts 141 and 151 of the foregoing embodiments are integral parts of the contact springs 104 and 105, respectively, an alternative structure is to arrange the contacts separately from the contact springs, with the conduction state of the contacts being varied by the movement of the contact springs.

As an alternative arrangement, the first weight 101 may be rendered the exertion of a resilient force of a coil spring or the like against the swing motion caused by the impact of collision, with a contact being formed on the surface of the weight 100 against a fixed contact so that these contacts make or break the conduction by sliding.

Although in the foregoing embodiments, the first weight 101 and second weight 103 have the common shaft 102, they may be provided with individual shafts.

Although the contacts of the foregoing embodiments are normally open and they close in response to the acceleration above a certain level, the contacts may be of normally-closed type so that they open in response to the acceleration above a certain level. The present invention having been described above with reference to the first to the fourth embodiments should not be limited to the disclosed embodiments and modifications. It may be implemented in various other ways without departing from the spirit and scope of the invention.

What is claimed is:

1. A collision detection device for a moving body comprising:

a weight which is pivoted at a position eccentric from a barycenter thereof and adapted to swing in a certain direction in response to an acceleration acting thereon; and contacts exerting a bias force on said weight and having their conduction state varied by swing motion of said weight, thereby indicating an incident of collision of said moving body, wherein said weight includes:

an eccentric section which has a swing axis eccentric from the barycenter and defines an eccentric mass moment and a portion of a moment of inertia of said weight; and an inertial section symmetrical with respect to a barycenter of said inertial section, which swings together with said eccentric section and defines a portion of the moment of inertia of said weight about a swing shaft thereof, but contributes no eccentric mass moment to said weight, wherein said inertial section and eccentric section of said weight are separate parts, with said inertial section being fixed to the swing shaft which swings together with said eccentric section.

2. A collision detection device for a moving body comprising:

a weight which is pivoted at a position eccentric from a barycenter thereof and adapted to swing in a certain direction in response to an acceleration acting thereon; and contacts exerting a bias force on said weight and having their conduction state varied by swing motion of said weight, thereby indicating an incident of collision of said moving body, wherein said weight includes:

an eccentric section which has a swing axis eccentric from the barycenter and defines an eccentric mass moment and a portion of a moment of inertia of said weight; and an inertial section symmetrical with respect to a barycenter of said inertial section, which swings together with said eccentric section and defines a portion of the moment of inertia of said weight about a swing shaft thereof, but contributes no eccentric mass moment to said weight, wherein said inertial section of said weight has a greater specific gravity than said eccentric section.

3. A collision detection device according to claim 2, wherein said eccentric section of said weight is made of resin and said inertial section is made of metal.

4. A collision detection device comprising:

a base;

a first weight pivoted eccentrically to swing in a first direction in response to an acceleration acting thereon;

contacts exerting a bias force on said first weight and having a conduction state varied by a swing motion of said first weight to indicate the acceleration above a predetermined level;

a second weight mounted so as to be movable independently from said first weight and constructed and arranged to have a time delay of response and a lower velocity of response to the acceleration relative to said first weight; and means for coupling said first weight to said second weight when said second weight swings.

5. A collision detection device according to claim 4, wherein said second weight has a smaller eccentric mass moment than that of said first weight.

6. A collision detection device according to claim 4, wherein said first weight has a greater ratio of an eccentric mass moment to an inertial mass moment relative to that of said second weight.

7. A collision detection device according to claim 4, wherein said first weight swings faster than said second weight when the acceleration has a duration that is shorter than a predetermined duration and said coupling means causes said first weight to swing together with said second weight when the acceleration has a duration that is longer than the predetermined duration.

8. A collision detection device according to claim 4, wherein when the acceleration has a duration that is shorter than a predetermined duration, said coupling means couples said first weight to said second weight during a swing after said first weight swings beyond a threshold swing angle and before said first weight swings back to the threshold swing angle so that a counter force is exerted on said first weight against the swing motion thereof.

9. A collision detection device according to claim 4, wherein said coupling means is constructed to transmit the bias force from said first weight to said second weight at an initial position of said coupling means in the absence of acceleration, and to interrupt transmission of the bias force from said first weight to said second weight as said first weight swings in the first direction thereby to free said second weight to swing without the bias force transmitted thereto until a swing angle of said second weight is equal to a swing angle of said first weight, at which point the coupling means again transmits the bias force from said first weight to said second weight.

10. A collision detection device according to claim 9, wherein said first weight swings in the first direction faster than said second weight when the acceleration has a duration that is shorter than a predetermined duration, and wherein said first weight bounces on a limiting member after swinging beyond the threshold swing angle and is coupled to said second weight, which swings slower in the first direction, during a back swing of said first weight to a threshold swing angle in a second direction opposite to the first direction, so that a return of said first weight to the threshold swing angle is delayed.

11. A collision detection device according to claim 10, wherein ratios of an eccentric mass moment to a moment of inertia of said first and said second weights are predetermined so that said first weight swings in the first direction faster than said second weight when the acceleration has the duration that is shorter than the predetermined duration and so that said first weight bounces on the limiting member after swinging beyond the threshold swing angle and is coupled to said second weight, which swings slower in the first direction, during the back swing of said first weight to the threshold angle in the second direction, so that the return of said first weight to the threshold swing angle is delayed.

12. A collision detection device according to claim 4, wherein said coupling means comprises a first pin fitted on said second weight.

13. A collision detection device according to claim 12, wherein said first pin couples said first weight to said second weight so that both weights swing together when the acceleration has a duration that is longer than a predetermined duration.

14. A collision detection device according to claim 12, wherein said second weight further includes a second pin which is fitted at a position of an advanced swing angle in the first direction relative to said first pin, said first weight coupling with said second pin during a swing of said first weight in the first direction beyond a threshold swing angle when the acceleration has a duration that is shorter than a predetermined duration, thereby lowering a swing velocity of said first weight.

15. A collision detection device according to claim 4, wherein said coupling means includes a boss formed on said first weight and an opening in said second weight along a swing direction for receiving said boss therein.

16. A collision detection device according to claim 15, wherein said opening formed in said second weight has a fist end and a second end which is located at a position of an advanced swing angle in the first direction relative to said first end, and said first end of said opening is constructed to come into contact with said boss on said first weight so that said first weight swings together with said second weight when the acceleration has a duration that is longer than a predetermined duration.

17. A collision detection device according to claim 15, wherein said opening formed in said second weight has a first end and a second end which is located at a position of an advanced swing angle in the first direction relative to said first end, said boss on said first weight being engageable with said first end and said second end of said opening during a swing of said first weight in the first direction beyond a threshold swing angle when the acceleration has a duration that is shorter than a predetermined duration, thereby lowering a swing velocity of said first weight.

18. A collision detection device according to claim 17, wherein said second weight is non-eccentric.

19. A collision detection device according to claim 4, further comprising:
    a cam rotor provided to swing together with said first weight and having a cam profile; and
    a pair of contact springs having confronting contacts, said contact springs standing on said base by being spaced out from each other and having their ends in contact with said cam profile so as to exert resilient bias forces on said first weight through said cam rotor, so that said contacts have their conduction state varied by the swing motion of said first weight.

20. A collision detection device according to claim 4, further comprising:
    a spring which exerts the bias force on said first weight, wherein said contacts comprise sliding contacts including a moving contact member formed on a surface of said first weight and a fixed contact member formed on a fixed surface confronting the surface of said first weight.

21. A collision detection device comprising:
    a base;
    a housing coupled to said base;
    a shaft carried by said housing;
    a weight carried on said shaft and adapted to swing on said shaft in response to acceleration applied to said device, said weight including:
        an eccentric section having a barycenter that is displaced from said shaft so as to define an eccentric mass moment of said weight; and
        an inertial section shaped symmetrically with respect to said shaft so that a barycenter of said inertial section coincides with said shaft and said inertial section contributes no eccentric mass moment to said weight, said inertial section defining a moment of inertia of said weight about said shaft; and
        contacts operatively arranged with respect to said weight and constructed and arranged to be actuated by said weight as said weight swings in response to an acceleration applied to said device to change a state of contact between said contacts to indicate a collision,
    wherein said eccentric section and said inertial section of said weight comprise separate members.

22. A collision detection device comprising:
    a base;
    a housing coupled to said base;
    a shaft carried by said housing;
    a weight carried on said shaft and adapted to swing on said shaft in response to acceleration applied to said device, said weight including:
        an eccentric section having a barycenter that is displaced from said shaft so as to define an eccentric mass moment of said weight; and
        an inertial section shaped symmetrically with respect to said shaft so that a barycenter of said inertial section coincides with said shaft and said inertial section contributes no eccentric mass moment to said weight, said inertial section defining a moment of inertia of said weight about said shaft; and
        contacts operatively arranged with respect to said weight and constructed and arranged to be actuated by said weight as said weight swings in response to an acceleration applied to said device to change a state of contact between said contacts to indicate a collision,
    wherein said inertial section of said weight has a greater specific gravity than said eccentric section.

23. A collision detection device comprising:
    a base;
    a housing coupled to said base;
    a shaft carried by said housing;
    a weight carried on said shaft and adapted to swing on said shaft in response to acceleration applied to said device, said weight including:
        an eccentric section having a barycenter that is displaced from said shaft so as to define an eccentric mass moment of said weight; and
        an inertial section shaped symmetrically with respect to said shaft so that a barycenter of said inertial section coincides with said shaft and said inertial section contributes no eccentric mass moment to said weight, said inertial section defining a moment of inertia of said weight about said shaft; and
        contacts operatively arranged with respect to said weight and constructed and arranged to be actuated by said weight as said weight swings in response to an acceleration applied to said device to change a state of contact between said contacts to indicate a collision,
    wherein said eccentric section of said weight is made of resin and said inertial section is made of metal.

* * * * *